(12) United States Patent
Rosen

(10) Patent No.: US 11,987,392 B2
(45) Date of Patent: May 21, 2024

(54) SATELLITE CONTROL SYSTEM USING ELECTRICALLY CONTROLLABLE VARIABLE REFLECTION GLASS PANELS

(71) Applicant: The Boeing Company, Chicago, IL (US)

(72) Inventor: Harold A. Rosen, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 818 days.

(21) Appl. No.: 16/872,070

(22) Filed: May 11, 2020

(65) Prior Publication Data

US 2020/0299005 A1 Sep. 24, 2020

Related U.S. Application Data

(63) Continuation of application No. 15/074,786, filed on Mar. 18, 2016, now Pat. No. 10,647,450.

(51) Int. Cl.
| | | |
|---|---|---|
| *B64G 1/24* | (2006.01) | |
| *B64G 1/36* | (2006.01) | |
| *B64G 1/40* | (2006.01) | |
| *B64G 1/44* | (2006.01) | |

(52) U.S. Cl.
CPC ............. *B64G 1/242* (2013.01); *B64G 1/244* (2019.05); *B64G 1/363* (2013.01); *B64G 1/407* (2013.01); *B64G 1/443* (2013.01)

(58) Field of Classification Search
CPC ........ B64G 1/242; B64G 1/363; B64G 1/443; B64G 1/407; G05D 1/0883
See application file for complete search history.

(56) References Cited

U.S. PATENT DOCUMENTS

| | | |
|---|---|---|
| 3,304,028 A | 2/1967 | Dryden |
| 4,084,773 A | 4/1978 | Schmidt et al. |
| 4,371,135 A | 2/1983 | Keigler |
| 4,426,052 A | 1/1984 | Hubert et al. |
| 5,133,518 A | 7/1992 | Flament |
| 5,149,022 A | 9/1992 | Flament |
| 5,305,971 A * | 4/1994 | Decanini ............... B64G 1/244 244/172.7 |
| 5,310,144 A | 5/1994 | Salvatore et al. |
| 5,312,073 A | 5/1994 | Flament et al. |
| 5,716,031 A | 2/1998 | Duchon |
| 6,102,336 A | 8/2000 | Cande |
| 6,260,808 B1 | 7/2001 | Bodeau et al. |
| 6,371,413 B1 | 4/2002 | Duchon |
| 2006/0011783 A1 | 1/2006 | Bang et al. |
| 2009/0012662 A1 | 1/2009 | Liu et al. |
| 2013/0032673 A1 | 2/2013 | Kobayashi |
| 2016/0257432 A1 | 9/2016 | Shmueli et al. |
| 2017/0144781 A1 | 5/2017 | Shoer et al. |
| 2018/0315877 A1 | 11/2018 | Kelzenberg et al. |

* cited by examiner

*Primary Examiner* — Valentina Xavier
(74) *Attorney, Agent, or Firm* — Gates & Cooper LLP

(57) ABSTRACT

A method and apparatus for the control of the attitude of earth orbiting satellites and the orbit and attitude control of a novel gravitational wave detection satellite configuration located near the sun-earth Lagrangian points L3, L4 and L5, utilizing the control of solar radiation pressure by the use of electrically controllable variable reflection glass panels to provide the torques and forces needed.

27 Claims, 13 Drawing Sheets

SATELLITE CONTROL SYSTEM USING ELECTRICALLY CONTROLLABLE VARIABLE REFLECTION GLASS PANELS

CROSS-REFERENCE TO RELATED APPLICATIONS

This application is a continuation of U.S. patent application Ser. No. 15/074,786, entitled "SATELLITE CONTROL SYSTEM USING ELECTRICALLY CONTROLLABLE VARIABLE REFLECTION GLASS PANELS," by Harold A. Rosen, PhD, filed Mar. 18, 2016 and issued May 12, 2020 as U.S. Pat. No. 10,647,450, which application is hereby incorporated by reference herein

BACKGROUND

1. Field

The present disclosure relates generally to spacecraft attitude and orbital control systems, and specifically a spacecraft attitude control system for use in earth orbiting satellites and spacecraft orbit and attitude control of spacecraft of a novel very long baseline gravitational wave detection satellite configuration located near the sun-earth Lagrangian points L3, L4 and L5, utilizing the control of solar radiation pressure by the use of electrically controllable variable reflection glass panels to provide the required torques and forces.

2. Description of the Related Art

Earth orbiting satellites are known and have been utilized for a large number of purposes, such as communications, navigation, weather observation, and research. The orbital elements of these satellites vary greatly, depending on the purpose of the satellite. Satellites in general are not restricted to earth orbits as they may orbit the sun or other planets. Regardless of mission, most satellites undergo several distinct phases requiring substantial forces and torques: launch, injection into an intermediate orbit, and injection into the operational orbit. The control forces and torques needed for these phases are significant. However, once the satellite is placed into its operational orbit, the torques required for attitude control are more easily manageable, and, in the case of the novel gravitational wave detection satellite configuration, the forces for orbital control are also more easily manageable.

Typically, the attitude of satellites is controlled by actuators that comprise chemical or electrical thrusters. Such satellites may include electrically powered reaction wheels (also known as momentum wheels) to aid in attitude control. The problem with using such thrusters can be the transient attitude disturbances they create and the resulting disturbance of the pointing of narrow communication beams or even narrower beams of optical payloads. Additionally, the thruster fuel usage may adversely affect the launch mass of the satellite if the satellite is intended for long duration operation. Adding to these problems, momentum wheels used for attitude control require periodic thruster actuation to keep their angular momentum within prescribed limits.

The orbital control of satellites has also used chemical and electrical thrusters, but require greater use of fuel and/or power over the satellite lifetime, and thus are often the limiting factor in satellite life.

What is needed is a system and method for controlling the attitude of satellites that minimizes transient attitude disturbances and permits more precise control. In orbits where satellite orbital control needs are minimal, what is needed is a system and method that controls forces in such a way that essentially allows for unlimited satellite lifetime, and also does not contaminate any sensitive instruments onboard the satellite.

SUMMARY

To address the requirements described above, this document discloses the use of panels of variable reflectivity to control the attitude and orbit of spacecraft. This is accomplished by controllably varying the reflectivity according to an error signal obtained from sensor measurements.

The electrically controllable variable reflection glass panel comprises two thin outer layers of highly transparent glass; a middle layer, of liquid crystal droplets embedded in a polymer, whose transparency is electrically controlled by transparent electrodes; and a reflective film on the rear surface of the outer layer that is farther from the sun. This enables an electrically controllable variable reflected light. The magnitude of the reflected light is controlled by impressing a low, variable voltage on the external electrode contacts, creating an electric field in the polymer layer that causes the layer to go from a least to a most transparent arrangement in response to that field. This results in a variable solar radiation pressure on the panel that is used for controlling the satellite.

Several embodiments are disclosed, including a first embodiment in which the control panels are affixed to the solar panels of a conventional geostationary satellite, and a second embodiment in which the control panels are affixed to a cylindrical body of a scientific geostationary satellite. In these embodiments, the control panels are used solely for satellite attitude control. In a third embodiment, in which the control panels are affixed to the body of a satellite and the satellite is placed near a Lagrangian point, the control panels are used for both satellite attitude and orbit control.

The features, functions, and advantages that have been discussed can be achieved independently in various embodiments or may be combined in yet other embodiments of which further details can be seen with reference to the following description and drawings.

DESCRIPTION OF THE DRAWINGS

Referring now to the drawings in which like reference numbers represent corresponding parts throughout.

DESCRIPTION

Figure 1:
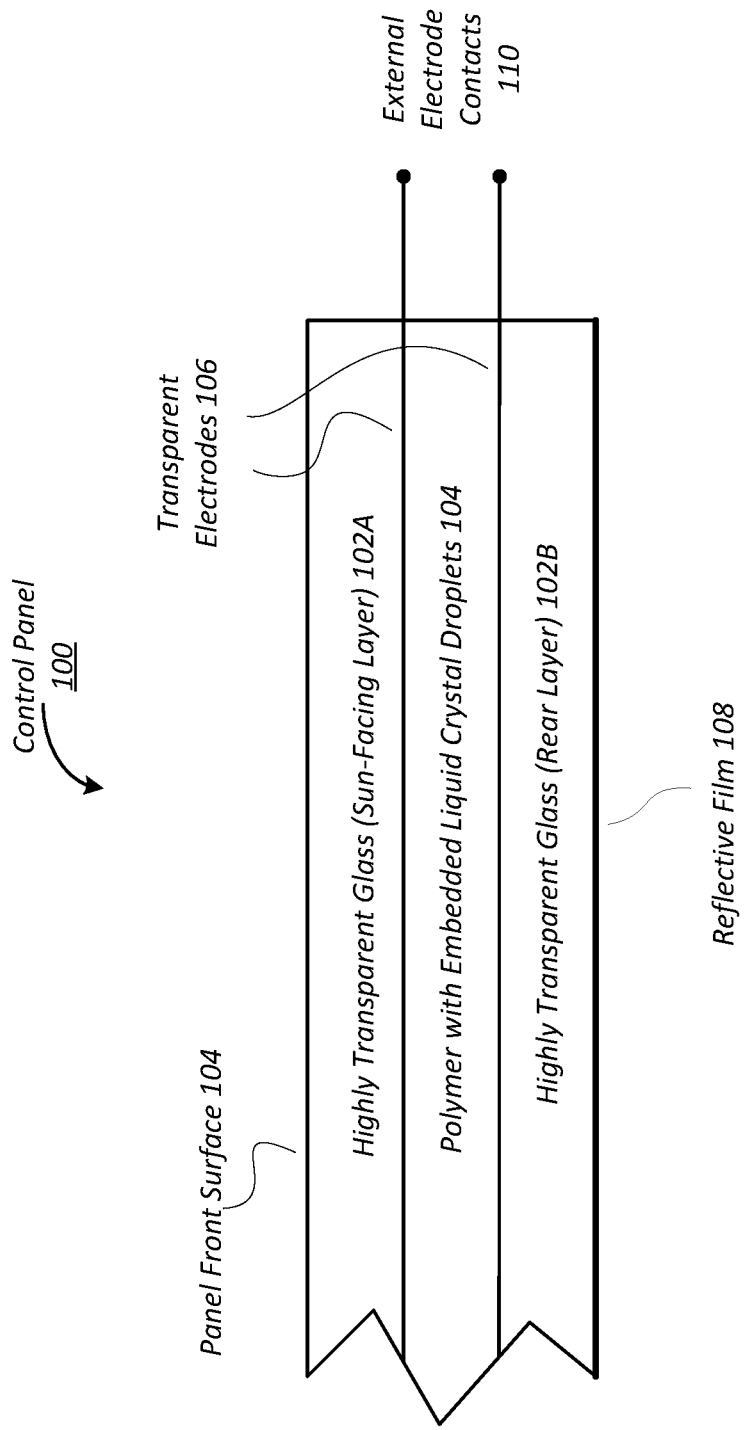
FIG. 1 is a view of an electrically controllable variable reflection glass panel.

In the following description, reference is made to the accompanying drawings which form a part hereof, and which is shown, by way of illustration, several embodiments. It is understood that other embodiments may be utilized and structural changes may be made without departing from the scope of this disclosure.

Overview

Disclosed is a control system for a satellite that modulates the solar radiation pressure with electrically controllable variable reflection glass panels to generate forces and torques needed for satellite control. The property controlled by the so-called smart glass is its light transmission in response to low power electrical input. Smart glasses having these properties have been used to electrically control the light level in homes, offices, and airplanes. As opposed to these systems, in the system herein used for satellites, a reflective film is added to the assembly and no external transmission is possible. In addition, measurements of the light reflection versus voltage are made in order that the system can be electronically linearized, making it possible to control the system without cross-coupling among the orbit control functions and attitude control functions.

To generate the torques needed for attitude control and the forces needed for orbit control, this invention makes use of a reflective film on the glass surface away from the sun of the electrically controllable variable reflection glass panel, causing the radiation pressure vector to vary with the reflectivity. In addition, the geometric arrangement, size, and orientation of the electrically controllable variable reflection glass panels are designed to yield the desired forces and torques for the particular mission.

Three exemplary applications are described in this disclosure. They include a geostationary communications satellite application, a cloud-monitoring earth satellite application, and an application directed to a very long baseline constellation of gravitational wave detection satellites located near the L3, L4, and L5 earth-sun Lagrangian points. In the first two applications, attitude control is improved, but gravitational and other forces inherent in those orbits render the electrically controllable variable reflection glass panels impractical for orbital control and maintenance. However, in the third application, the electrically controllable variable reflection glass panels provide not only precision attitude control but also orbit control as well. Orbit control without the use of thrusters in this application is practical because the gravitational perturbations in the orbit used are much less than for earth-orbiting satellites. For example, in the orbits described herein inclination control, the largest component of orbit control for earth-orbiting satellites, is not needed. Likewise, East-west drift and eccentricity corrections also are not needed because of the stability inherent in the Lagrangian points. As described below, to compensate for the solar radiation pressure in the radial direction, the three satellites are located at points slightly closer to the sun than the Lagrangian points. (At the Lagrangian points, there are no forces, as the gravitational and centrifugal forces cancel each other. The satellites depart from it in the radial direction by an amount that provides a force that is equal to and opposite in direction to the solar radiation pressure.)

FIG. 1 is a view of an electrically controllable variable reflection glass panel 100 that comprises two thin outer layers of highly transparent glass 102A, 102B (alternatively referred to hereinafter as outer layers 102); a middle layer 104 comprising liquid crystal droplets embedded in a polymer, whose transparency is electrically controlled by transparent electrodes 106; and a reflective film 108 on the rear surface of the outer layer 102B that is farther from the sun. This enables an electrically controllable variable reflected light.

The magnitude of the reflected light is controlled by impressing a low, variable voltage on external electrode contacts 110 which are electrically coupled to the respective transparent electrodes 106, creating an electric field in the polymer layer 104 that causes the rod-like liquid crystal droplets within the layer 104 to go from a least to a most transparent arrangement in response to that field. This results in a variable solar radiation pressure on the panel 100 that is used for controlling the satellite.

FIGS. 2A, 2B, 2C and 2D are diagrams depicting vectors that show how the variation of this solar radiation pressure affects the magnitude and direction of the force exerted on the electrically controllable variable reflection glass panel. The incident force vector, $F_i$, is fixed for a given panel, independent of the light reflected from the electrically controllable variable reflection glass panel. The control force, $F_r$, which varies with the light reflection, is always opposite to the direction of the reflected light.

Figure 2A:
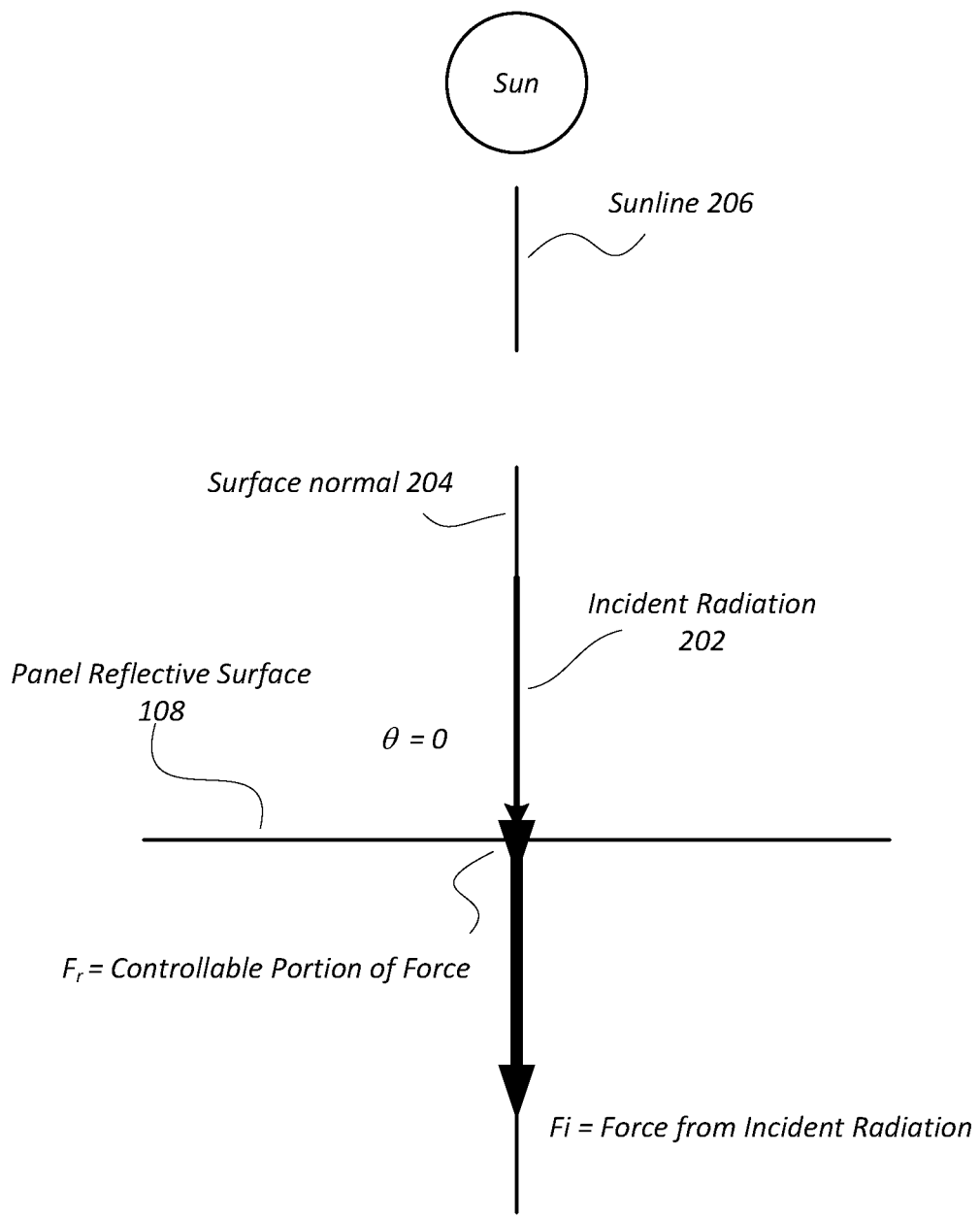
FIGS. 2A, 2B, 2C and 2D are diagrams depicting vectors that show how the variation of solar radiation pressure affects the magnitude of the control force exerted on the electrically controllable variable reflection glass panel.
Figure 2B:
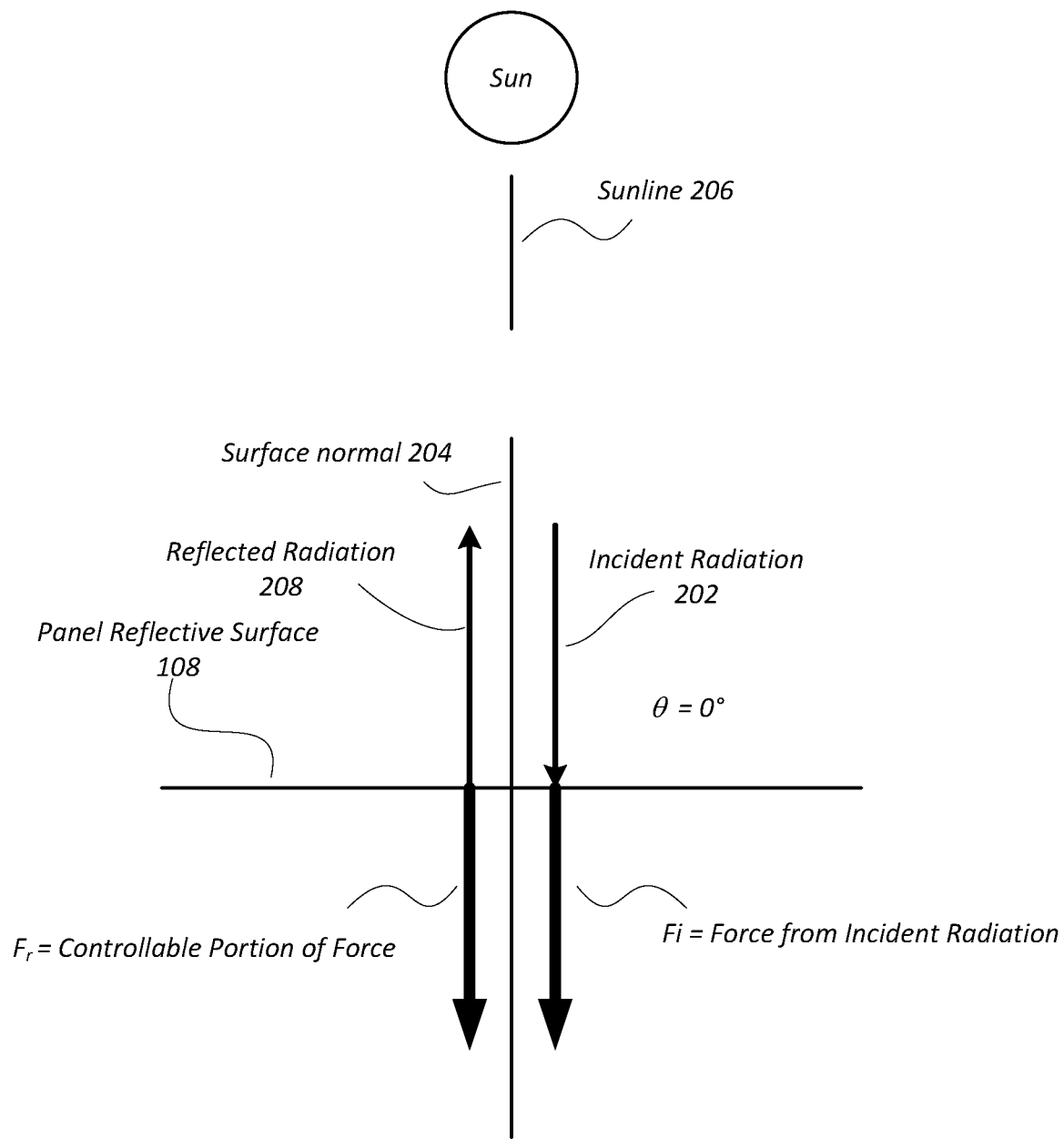

Turning first to FIGS. 2A and 2B, the solar radiation pressure results from the change in momentum of the impinging photons: when they are absorbed and come to a halt their velocity change is equal to c, the velocity of light. When incident radiation 202 reflected by a the panel reflective surface 108 normal to the direction of the incoming light (e.g. parallel to surface normal 204), the photons undergo a change of 2c, since the reflected photons travel toward the sun at the speed of light. At the distance from the sun to the earth, one astronomical unit (AU) or $1.5 \times 10^8$ kilometers, the average solar power flux density P is 1366 watts per square meter. P varies inversely with the square of the distance from the sun. The pressure p is this flux divided by the speed of light c, or P/c. At one AU, the pressure p is $4.5 \times 10^{-6}$ Newtons per square meter. The corresponding force $F_i$ has a magnitude of Ap Newtons, where A is the area of the surface panel reflective surface 108 projected perpendicular to the sunline 206 in square meters. If (as illustrated in FIG. 2B) the surface 108 is normal to the sunline 206 and reflects all the incoming light, p is twice as much, or $9.0 \times 10^{-6}$ Newtons per square meter. The diagrams in FIGS. 2A and 2B illustrate these cases, with FIG. 2A depicting the case where the panel 100 is set for zero reflection and FIG. 2B depicting the case where the panel 100 is set for full reflection.

While twice as much radiation pressure is obtained in these cases where the incident radiation is normal to the panel front surface, the amount that can be controlled is the same as when no reflection occurs since the change in momentum due to the incident photons is a constant. However, because the control panels will likely be connected to a solar panel substrate to meet the required panel stiffness, the reflective layer is still useful in that it forms a barrier that isolates the panel from its mounting surface.

Figure 2C:
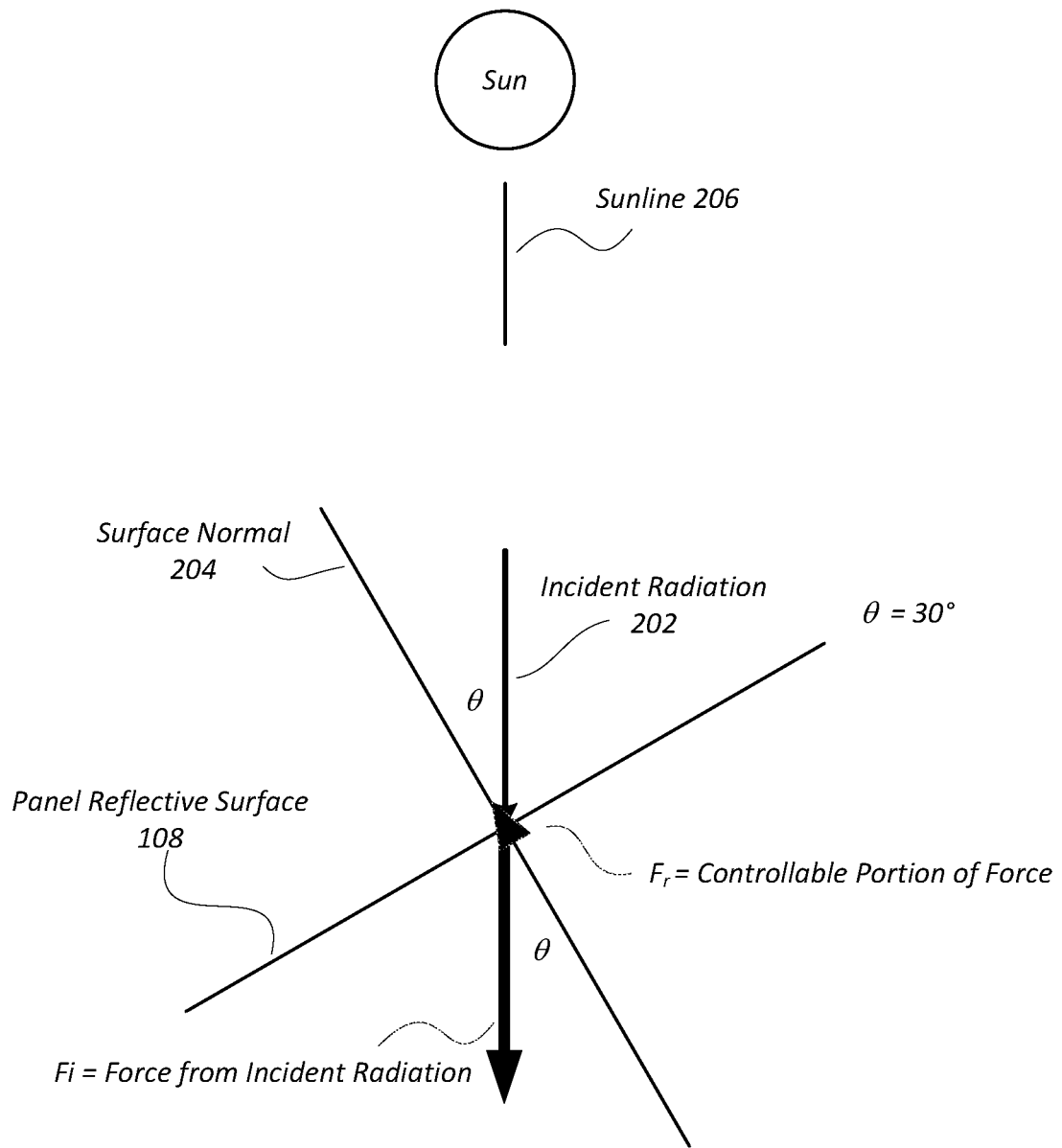
Figure 2D:
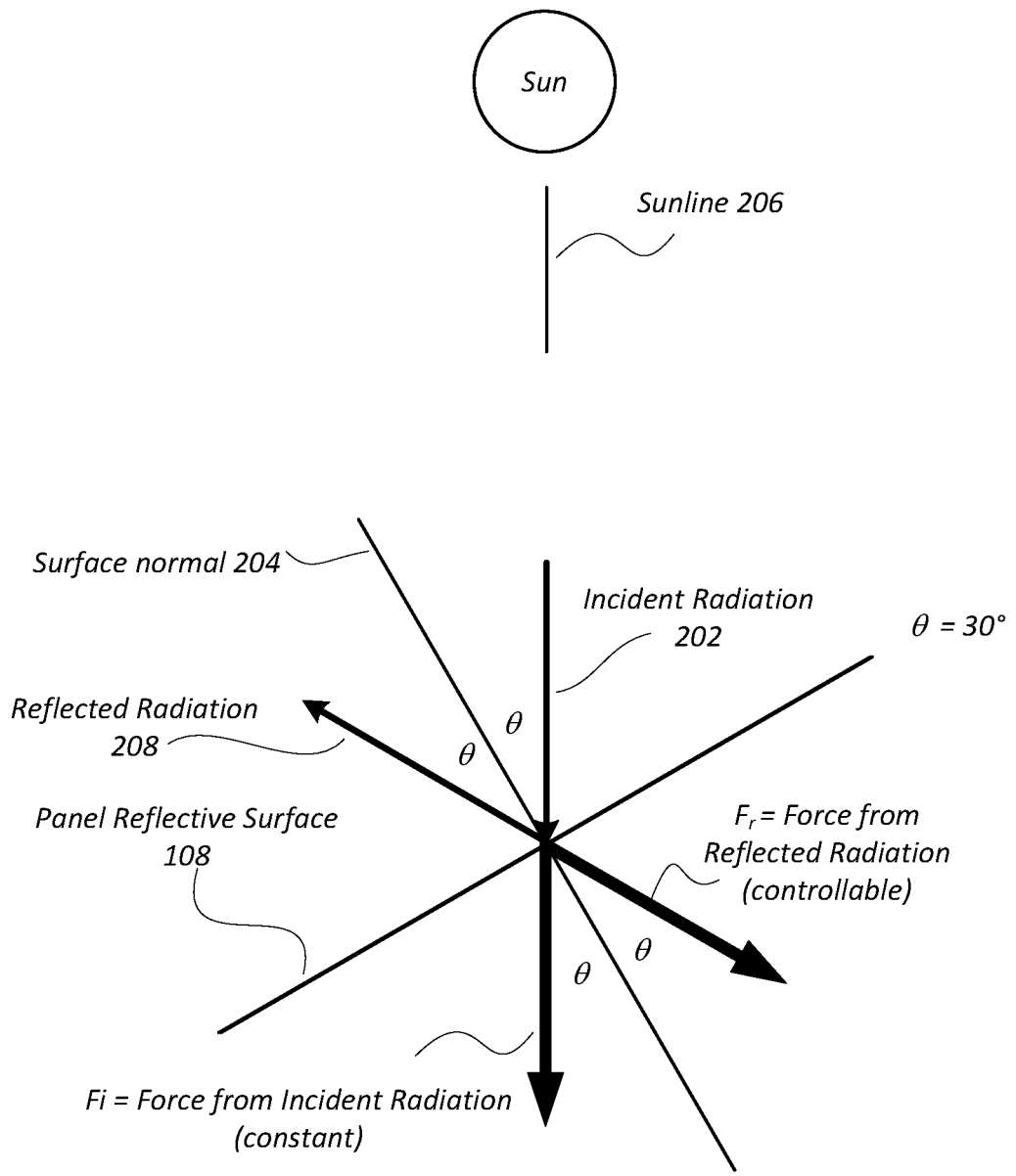

FIGS. 2C and 2D illustrate that a major benefit of having a reflective layer (e.g. layer 102B with the reflective film 108) is when the reflective surface 108 is not normal to the direction to the sun (e.g. the sunline 206). This results in a control force component that can be perpendicular to the sunline 206. The magnitude of this force is affected by the amount of light reflected by the control panel 100. This is shown by the vector diagrams for a surface 108 whose normal is rotated by a thirty-degree angle from the sun direction.

In FIG. 2C, it is assumed that all the impinging light (e.g. incident radiation 202) is absorbed by panel 100, whereas in FIG. 2D, it is assumed that all the impinging light is reflected by the panel 100. The angle θ of the reflected light 208 from the surface normal 204 is equal to the angle θ of the surface normal 204 to the sunline 206. In the case shown in the vector diagram presented in FIG. 2D, the value of θ is thirty degrees, and the reflected light 208 is N or sixty degrees from the sunline 206.

Figure 3:
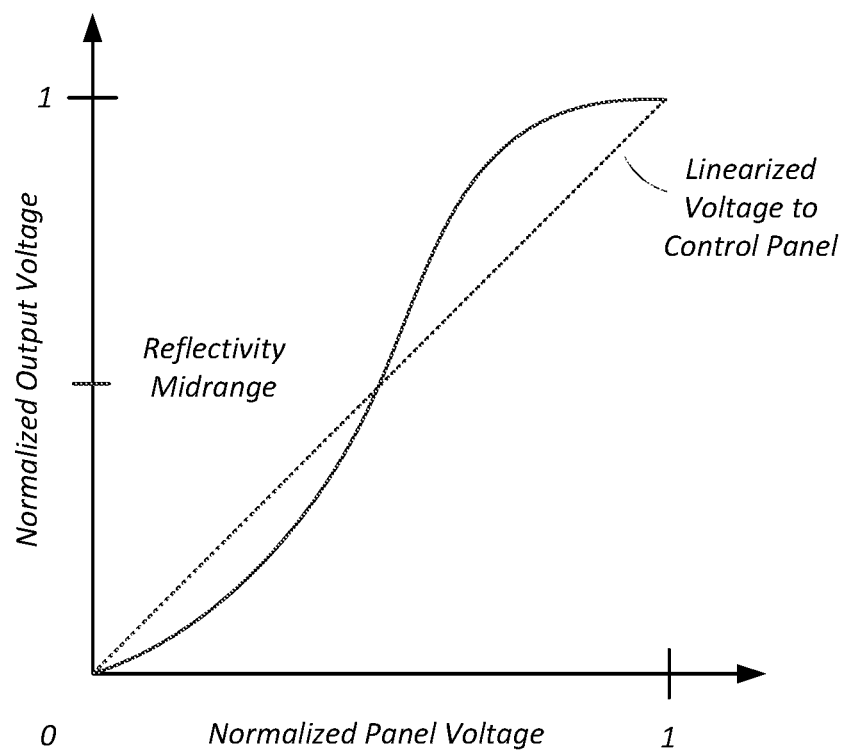
FIG. 3 is a diagram presenting a typical laboratory measurement of the output voltage, representing the light reflected by the control panel, versus the voltage applied to its external electrode contacts.

FIG. 3 is a diagram presenting a typical relationship between light reflected by the control panel, represented by the output voltage, versus voltage applied to the contacts 100. Because of inherent system non-linearities, the light reflected from the panel 100 will not typically be a linear function of the voltage applied to the contacts 110. As illustrated, the normalized light reflected from the control panel typically varies non-linearly with the voltage applied to the contacts 110. Since a linear control system is desirable, this non-linearity may be compensated for. In one embodiment, this may be performed via electronic circuitry in the satellite, for example by use of a linearizing function implemented in a processor with memory. For example, before the satellite is launched, the actual control panel 100 output may be measured and used to generate a function or lookup table that converts a voltage command to the control panel 100 to a linearized voltage command that is actually provided to the control panel 100. This function may be stored in a memory of the satellite controller. This permits the desired satellite attitude and orbit controls to be designed with precision and without cross-coupling among the six degrees of freedom involved in attitude and orbit control.

The voltage commands to the control panels are biased so that a nominal command in response to an error signal of zero is associated with a midrange of reflectivity of each of the control panels, allowing both positive and negative panel correction forces.

First Application—Geostationary Communication Satellite

Figure 4:
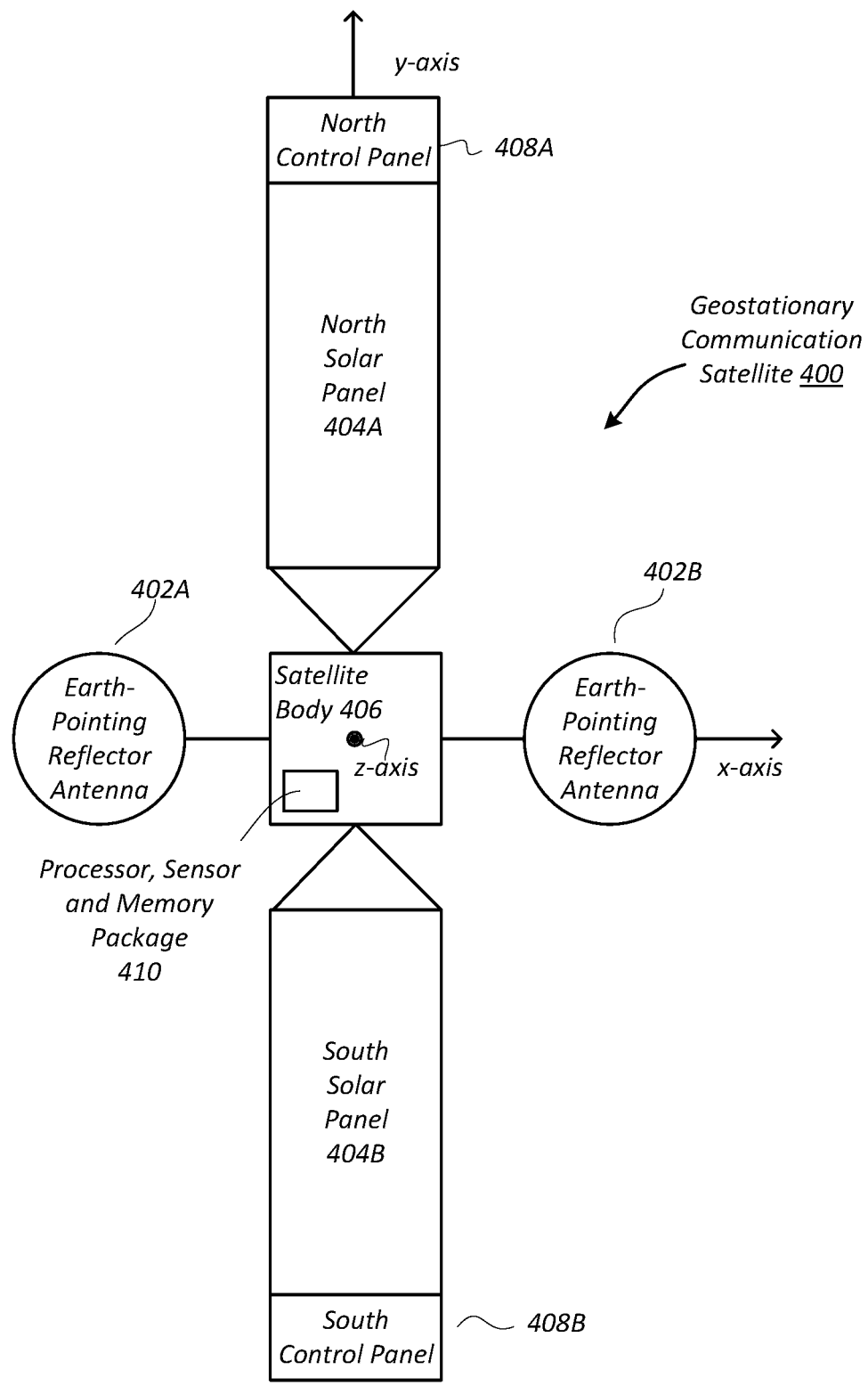
FIG. 4 is a diagram illustrating the arrangement of the control panels on a conventional geostationary communication satellite.

FIG. 4 is a diagram illustrating how the attitude control during the operational phase of a conventional geostationary communication satellite 400 can be improved by use of electrically controllable variable reflection glass panels rather than conventional means such as thrusters and momentum wheels. The geostationary satellite 400 shown has two earth-pointing reflector antennas 402A and 402B whose beams, ideally, always point to the specific areas on earth being served. The satellite 400 also includes north and south solar panels (404A and 404B, respectively) coupled to the satellite body 406 that rotate about their longitudinal axis relative to the satellite 360 degrees each day so that they can face the sun and generate the needed power. The view shown in FIG. 4 is for the midnight solar panel 404 position. The satellite 400 also includes a satellite controller having a processor, memory and sensor package 410 for performing the orbital and attitude control functions.

The two solar panels cannot be exactly alike, and their differences result in a small but persistent torques imposed on the satellite 400. Modern satellites use reaction wheels to maintain the desired satellite attitude, but also then require periodic use of thrusters to center the wheel speed, resulting in transient attitude disturbances. The transients associated with solar panel 404 imbalance can be avoided by using the north and south electrically controllable variable reflection glass control panels (408A and 408B, respectively) to continuously produce a torque opposing the disturbing torque. The torque command can be calculated (using the appropriate circuitry) and applied as a plus or minus signal, respectively, to the two panels 408A and 408B. In this way, a pure torque is always applied. This technique can also compensate for other sources, such as antennas, of radiation pressure imbalances. Further, although the control panels 408 are illustrated as being equidistant from the center of mass of the satellite 400, other embodiments are possible wherein the control panels are not equidistant, but are also of different surface area, so that the effective torques applied to the satellite body 406 by each control panel 408 about the x-axis are equal.

Second Application: Geostationary Cloud-Monitoring Satellite

Figure 5:
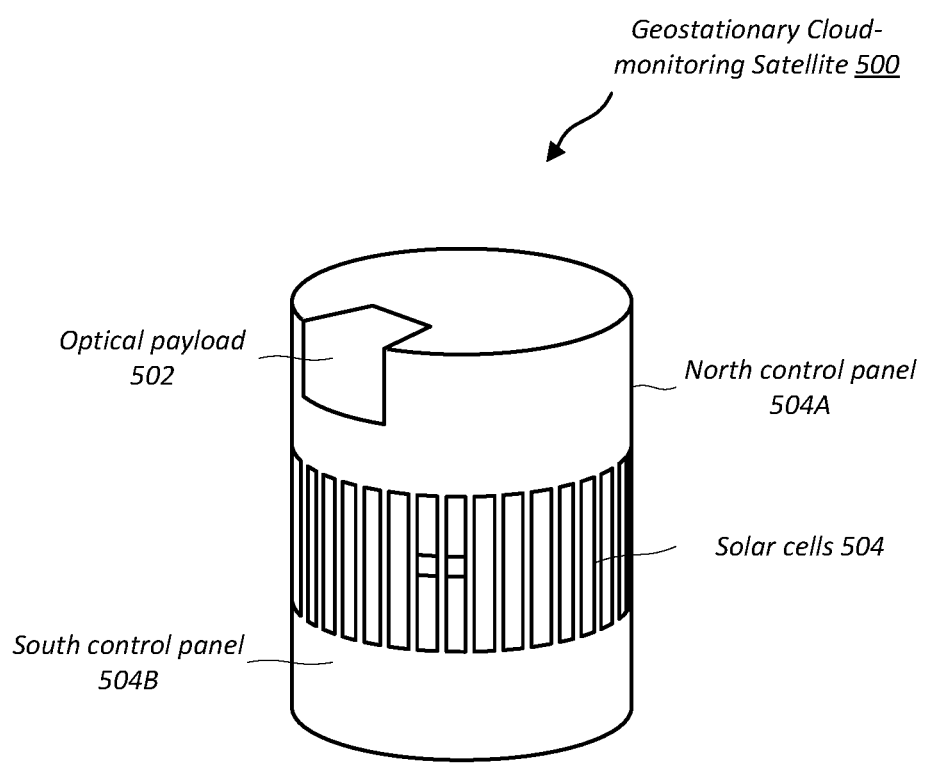
FIG. 5 is a diagram illustrating the arrangement of the control panels on a geostationary cloud-monitoring satellite.

FIG. 5 is a diagram illustrating the application to a geostationary cloud-monitoring satellite 500 having an optical payload 502 with a very narrow beam, demanding highly accurate and transient-free attitude control. Because the payload 502 requires very little power, the satellite power needs can be provided by solar cells 504 on its cylindrical surface rather than by external solar panels. In this application, the electrically controllable variable reflection glass panels are located on the northern and southern ends of the cylinder of the satellite body (504A and 504B, respectively) and are cylindrical rather than planar in shape in order to present the same view to the sun as the satellite performs its 24 hour period rotation. Alternatively, this could be provided by a multiplicity of small planar control panels arrayed around the satellite body to approximate the cylindrical surfaces of the north control panel 504A and the south control panel 504B.

Third Application: Gravitational Wave Detection Satellite

Figure 6A:
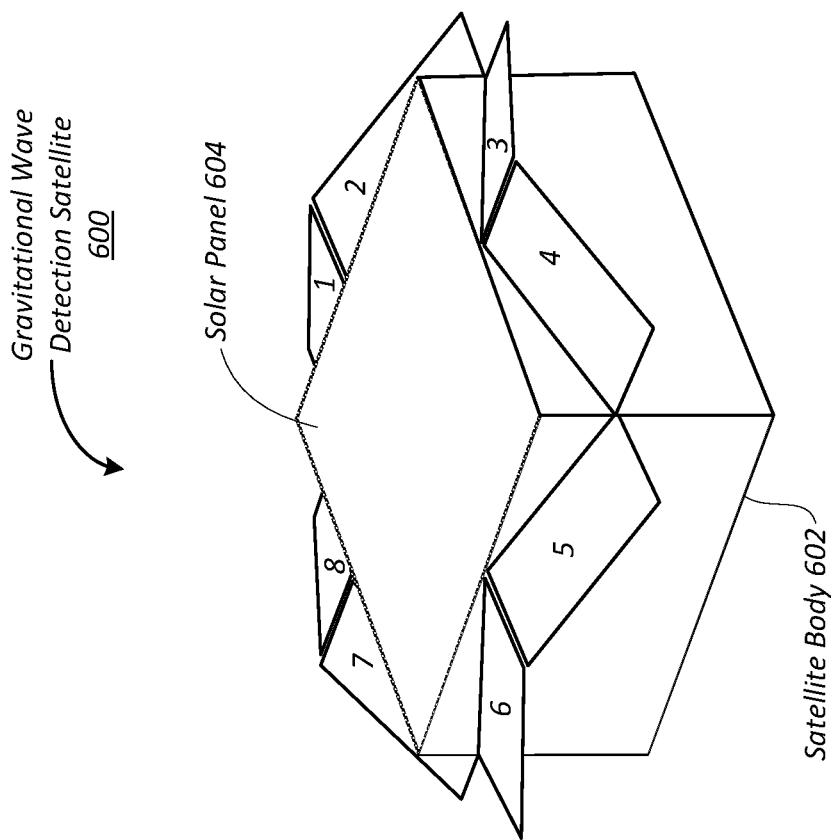
FIGS. 6A-6C are diagrams showing multiple views of the arrangement of the eight control panels on a gravitational wave detection satellite located near a Lagrangian point.
Figure 6B:
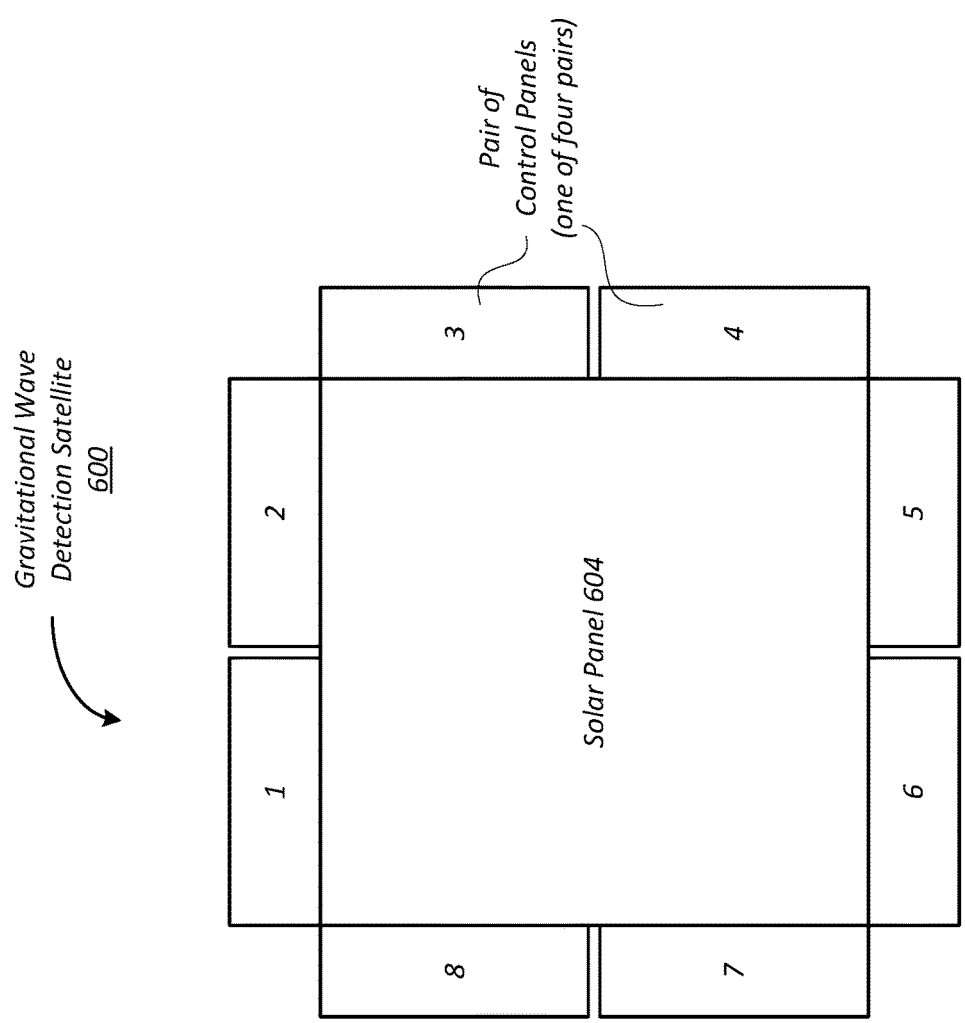
Figure 6C:
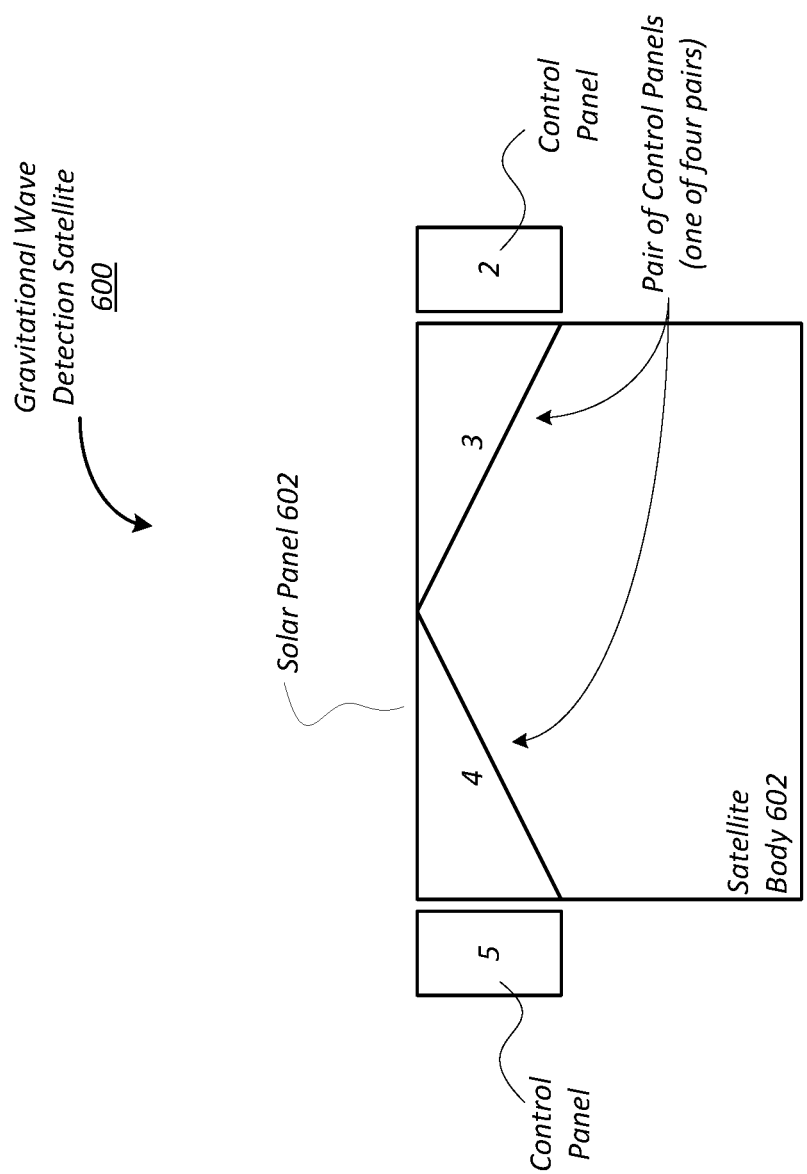

FIGS. 6A-6C are diagrams showing one embodiment in which variable reflection control panels are to be used to control both attitude and orbit in particular satellite orbits. This configuration permits all six degrees of freedom—three translational and three rotational—of the satellite to be controlled solely by use of the variable reflection control panels (without the need for thrusters), and provides a tremendous advantage in a space-based system for the detection and measurement of low frequency gravitational waves from the far reaches of the universe.

This requires a very long baseline space antenna. This very long baseline can be provided by the use of three satellites orbiting the sun at the Lagrangian points L3, L4 and L5 of the sun-earth system.

Figure 7:
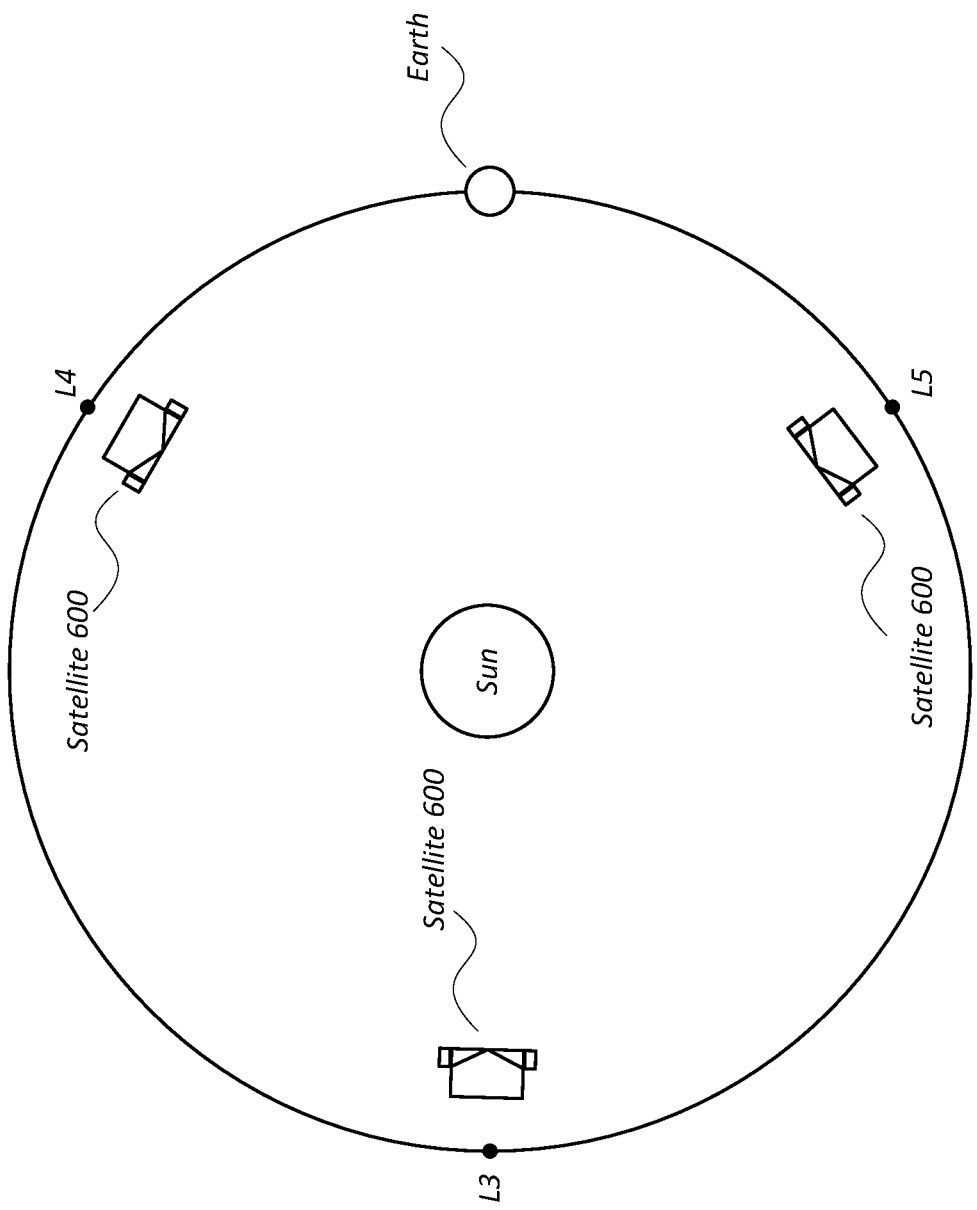
FIG. 7 is a diagram illustrating the relevant Lagrangian points (L3, L4 and L5) in the sun-earth system and the nearby locations and orientations of the three gravitational wave detection satellites.

FIG. 7 is a diagram illustrating these Lagrangian points. Because the gravitational disturbances are so small at these locations, being due primarily to the attractions of the other planets, orbit control is possible by the use of control panels alone on the satellite 600 and thus no thrusters are needed for this function. In addition, as in the cases of the earth-orbiting satellites, attitude control is possible as well.

FIG. 6A is a diagram illustrating an embodiment of a satellite 600 using eight electrically controllable reflection glass panels 1-8 on the satellite body 602. The control panels 1-8 are arranged into four pairs arrayed symmetrically about the sunline 206 and the center of mass of the satellite 600. As illustrated in FIG. 6A, control panels 1 and 2 together comprise a first pair of control panels. A second pair of control panels 5 and 6 are located on a side of the center of mass of the satellite 600 diametrically opposing the first pair of control panels 1 and 2. Similarly, control panels 3 and 4 comprise a third pair of control panels, and control panels 7 and 8 are located on a side of the satellite 600 center of mass diametrically opposing the third pair of control panels.

As illustrated in FIG. 6A, the normals 204 of each of the control panels 1-8 are offset in angle from the sunline 206 by an angle θ. In the illustrated embodiment, the offset angle θ is thirty degrees, which results in only a small loss of projected area and provides a good compromise among the force components perpendicular to and parallel to the sunline 206. Further, the reflected light 208 from each control panel 1-8 does not strike the solar panel 604, any other control panel, or other part of the satellite 600.

FIG. 6B is a diagram illustrating the same satellite 600 as seen from the point of view of the sun. The satellite always faces in this direction as it traverses its yearlong circular orbit.

FIG. 6C shows a side view of the same satellite 600. As can be seen in the drawing, the control surfaces are all rotated thirty degrees from the sun normal direction. This arrangement of panels allows control of each of the six degrees of freedom while eliminating cross-coupling.

Figure 8:
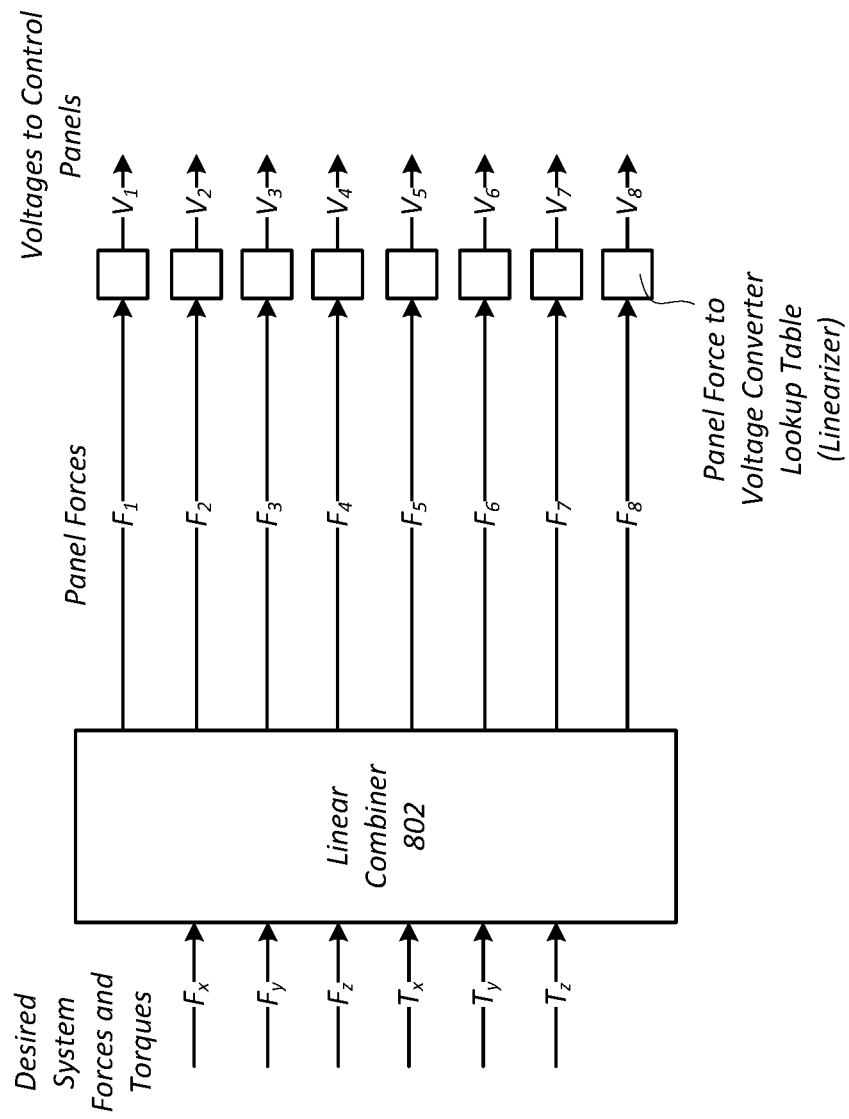
FIG. 8 is a diagram of a six degree of freedom controller that can be used with the eight control panel embodiment.

FIG. 8 is a diagram of a six degree of freedom controller that can be used with the eight control panel embodiment illustrated in FIGS. 6A-6C. Sensor measurements are used to provide error signals that are then used to generate control system forces ($F_x$, $F_y$, and $F_z$) and torques ($T_x$, $T_y$, and $T_z$) that drive the error signals to zero. Those desired system forces and torques are used by the linear combiner 802 to determine the panel forces ($F_1$-$F_8$) needed from each of the eight control panels. Each of these each panel forces ($F_1$-$F_8$) is converted into associated linearized voltages ($V_1$-$V_8$) provided to the electrodes 106 of the associated control panels. This closed loop process is performed continuously over time and with a continuous range of reflectivity levels, and hence drives the error signal to zero with minimal transients.

It is also noted that although an embodiment of the satellite 600 having eight control surfaces 1-8 has been discussed for purposes of illustration, a six degree of freedom control of the orbit and attitude of the satellite 600 may be obtained with fewer (e.g. six) control surfaces.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of controlling a satellite having a satellite body, comprising:
accepting an error signal; and
varying a reflectivity of at least one control panel coupled to the satellite body and at least partially facing the sun according to the error signal by varying a transparency of a layer of the at least one control panel to control the satellite in at least one of orbit and attitude;
wherein:
the at least one control panel comprises a glass panel having an electrically controllable variable reflection, wherein the glass panel comprises:
a first outer transparent layer located on a side of the control panel facing the sun;
a second outer transparent layer, having a reflective film located on a second transparent layer outer surface opposing the first outer transparent layer; and
a middle layer, located between the first outer transparent and the second outer transparent layer, the middle layer having an electrically controllable transparency.

2. The method of claim 1, wherein:
the at least one control panel comprises a plurality of control panels at least partially facing the sun, comprising:
a first control panel located on a first side of a center of mass of the satellite; and
a second control panel located on a second side of the center of mass of the satellite, diametrically opposing the first side of the center of mass of the satellite;
varying the reflectivity of the at least one control panel coupled to the satellite body according to the error signal comprises:
varying the reflectivity of each of the first control panel and the second control panel according to the error signal.

3. The method of claim 2, wherein:
the satellite comprises a first solar panel and a second solar panel, each coupled to and extending from the satellite body;
the first control panel is coupled to the first solar panel; and
the second control panel is coupled to the second solar panel.

4. The method of claim 2, wherein:
the at least one control panel comprises a plurality of pairs of control panels at least partially facing the sun, and located about a periphery of the satellite and symmetrically about a sunline between the satellite and the sun;
each of the plurality of pairs of control panels comprises a first control panel having a first control panel surface normal at an angle θ from a sunline between the satellite and the sun and an adjacent second control panel having a second control panel surface normal at an angle −θ from the sunline between the satellite and the sun; and
the step of varying the reflectivity of the at least one control panel coupled to the satellite body according to the error signal comprises:
varying a reflectivity of the plurality of pairs of control panels according to the error signal.

5. The method of claim 4, wherein:
the plurality of pairs of control panels comprises:
a first pair of control panels, located on a first side of the center of mass of the satellite;
a second pair of control panels, located on a second side of the center of mass of the satellite diametrically opposing the first pair of control panels;
a third pair of control panels, located on a third side of the center of mass of the satellite; and a fourth pair of control panels, located on a fourth side of the center of mass of the satellite diametrically opposing the third pair of control panels.

6. The method of claim 5, wherein the satellite is located near a Lagrangian point.

7. The method of claim 6, wherein:
the reflectivity of the at least one control panel is varied from a midpoint of control panel reflectivity; and
the satellite is located away from the Lagrangian point towards the sun to a location at which, with the control panels at a midpoint of reflectivity, the gravitational and centrifugal forces balance the total solar radiation force on the satellite.

8. The method of claim 1, wherein:
the middle layer comprises liquid crystal droplets embedded in a polymer and electrically coupled to transparent electrodes; and
the step of varying the reflectivity of the at least one control panel coupled to the satellite body according to the error signal comprises:
varying a voltage applied to the electrodes according to the error signal.

9. The method of claim 2, wherein:
the satellite body is cylindrically shaped, and comprises:
a substantially cylindrical surface having an upper portion and a lower portion;
the first control panel is located on the upper portion of the satellite body; and
the second control panel is located on a lower portion of the satellite body;
the step of varying the reflectivity of the at least one control panel coupled to the satellite body according to the error signal comprises:
varying a reflectivity of each of the first control panel and the second control panel according to the error signal.

10. The method of claim 9, wherein the first control panel and the second control panel substantially conform to the cylindrical surface.

11. The method of claim 2, wherein the reflectivity of the at least one control panel is varied from a midpoint of control panel reflectivity.

12. An apparatus for controlling a satellite having a satellite body, comprising:
at least one control panel, coupled to the satellite body and at least partially facing the sun;
wherein a reflectivity of the at least one control panel is varied by varying a transparency of a layer of the at least one control panel according to an error signal to control the satellite in at least one of orbit and attitude;
wherein:
the control panel comprises a glass panel having an electrically controllable variable reflection, wherein the glass panel comprises:
a first outer transparent layer located on a side of the control panel facing the sun;
a second outer transparent layer, having a reflective film located on a second transparent layer outer surface opposing the first outer transparent layer; and
a middle layer, located between the first outer transparent and the second outer transparent layer, the middle layer having an electrically controllable transparency.

13. The apparatus of claim 12, wherein:
the at least one control panel comprises a plurality of control panels at least partially facing the sun, comprising:
a first control panel located on a first side of a center of mass of the satellite; and
a second control panel located on a second side of the center of mass of the satellite, diametrically opposing the first side of the center of mass of the satellite;
wherein a reflectivity of each of the first control panel and the second control panel is varied according to the error signal.

14. The apparatus of claim 13, wherein:
the satellite comprises a first solar panel and a second solar panel, each coupled to and extending from the satellite body;
the first control panel is coupled to the first solar panel; and
the second control panel is coupled to the second solar panel.

15. The apparatus of claim 12, wherein:
the at least one control panel comprises a plurality of pairs of control panels at least partially facing the sun, and located about a periphery of the satellite and symmetrically about a sunline between the satellite and the sun;
each of the plurality of pairs of control panels comprises a first control panel having a first control panel surface normal at an angle $\theta$ from a sunline between the satellite and the sun and an adjacent second control panel having a second control panel surface normal at an angle $-\theta$ from the sunline between the satellite and the sun; and
a reflectivity of the plurality of pairs of control panels is varied according to the error signal.

16. The apparatus of claim 15, wherein:
the plurality of pairs of control panels comprises:
a first pair of control panels, located on a first side of the center of mass of the satellite;
a second pair of control panels, located on a second side of the center of mass of the satellite diametrically opposing the first pair of control panels;
a third pair of control panels, located on a third side of the center of mass of the satellite; and
a fourth pair of control panels, located on a fourth side of the center of mass of the satellite diametrically opposing the third pair of control panels.

17. The apparatus of claim 16, wherein the satellite is located near a Lagrangian point.

18. The apparatus of claim 17, wherein:
the reflectivity of the at least one control panel is varied from a midpoint of control panel reflectivity; and
the satellite is located away from a Lagrangian point towards the sun to a location at which, with the control panels at a midpoint of reflectivity, the gravitational and centrifugal forces balance the total solar radiation force on the satellite.

19. The apparatus of claim 12, wherein:
the middle layer comprises liquid crystal droplets embedded in a polymer and electrically coupled to transparent electrodes; and
the reflectivity of the at least one control panel coupled to the satellite body is varied according to the error signal by varying a voltage applied to the electrodes according to the error signal.

20. The apparatus of claim 12, wherein:
the satellite body is cylindrically shaped, and comprises:
a substantially cylindrical surface having an upper portion and a lower portion;

the at least one control panel comprises:
  a first control panel located on the upper portion of the satellite body; and
  a second control panel located on a lower portion of the satellite body; and
the step of varying the reflectivity of the at least one control panel coupled to the satellite body according to the error signal comprises:
  varying a reflectivity of each of the first control panel and the second control panel according to the error signal.

21. The apparatus of claim 20, wherein the first control panel and the second control panel substantially conform to the cylindrical surface.

22. A spacecraft, comprising:
a spacecraft body;
at least one control panel, coupled to the spacecraft body and at least partially facing the sun; and
a controller, for commanding a variable reflectivity of at least one control panel by varying a transparency of a layer of the at least one control panel according to an error signal to control the spacecraft in at least one of orbit and attitude;
wherein:
  the control panel comprises a glass panel having an electrically controllable variable reflection, wherein the glass panel comprises:
    a first outer transparent layer located on a side of the control panel facing the sun;
    a second outer transparent layer, having a reflective film located on a second transparent layer outer surface opposing the first outer transparent layer; and
    a middle layer, located between the first outer transparent and the second outer transparent layer, the middle layer having an electrically controllable transparency.

23. The spacecraft of claim 22, wherein:
the at least one control panel comprises a plurality of pairs of control panels at least partially facing the sun, and located about a periphery of the spacecraft and symmetrically about a sunline between the spacecraft and the sun;
each of the plurality of pairs of control panels comprises a first control panel having a first control panel surface normal at an angle θ from a sunline between the spacecraft and the sun and an adjacent second control panel having a second control panel surface normal at an angle −θ from the sunline between the spacecraft and the sun; and
a reflectivity of the plurality of pairs of control panels is varied according to the error signal.

24. The spacecraft of claim 23, wherein:
the plurality of pairs of control panels comprises:
a first pair of control panels, located on a first side of the center of mass of the spacecraft;
a second pair of control panels, located on a second side of the center of mass of the spacecraft diametrically opposing the first pair of control panels;
a third pair of control panels, located on a third side of the center of mass of the spacecraft; and
a fourth pair of control panels, located on a fourth side of the center of mass of the spacecraft diametrically opposing the third pair of control panels.

25. The spacecraft of claim 24, wherein the spacecraft is located near a Lagrangian point.

26. The spacecraft of claim 25, wherein:
the reflectivity of the at least one control panel is varied from a midpoint of control panel reflectivity; and
the spacecraft is located away from a Lagrangian point towards the sun to a location at which, with the control panels at a midpoint of reflectivity, the gravitational and centrifugal forces balance the total solar radiation force on the spacecraft.

27. The spacecraft of claim 22, wherein:
the middle layer comprises liquid crystal droplets embedded in a polymer and electrically coupled to transparent electrodes; and
the reflectivity of the at least one control panel coupled to the satellite body is varied according to the error signal by varying a voltage applied to the electrodes according to the error signal.

* * * * *